US011235463B2

(12) United States Patent
Inaba

(10) Patent No.: US 11,235,463 B2
(45) Date of Patent: Feb. 1, 2022

(54) ROBOT SYSTEM AND ROBOT CONTROL METHOD FOR COOPERATIVE WORK WITH HUMAN

(71) Applicant: FANUC CORPORATION, Yamanashi (JP)

(72) Inventor: Gou Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 220 days.

(21) Appl. No.: 16/571,206

(22) Filed: Sep. 16, 2019

(65) Prior Publication Data
US 2020/0122323 A1 Apr. 23, 2020

(30) Foreign Application Priority Data

Oct. 23, 2018 (JP) .............................. JP2018-199338

(51) Int. Cl.
*B25J 9/16* (2006.01)
*B25J 13/08* (2006.01)

(52) U.S. Cl.
CPC ........... *B25J 9/1633* (2013.01); *B25J 9/1694* (2013.01); *B25J 13/08* (2013.01)

(58) Field of Classification Search
CPC ........ B25J 9/1633; B25J 13/08; B25J 9/1694; B25J 9/1697; B25J 9/1679; B25J 13/085; G05B 2219/40152; G05B 2219/35444; G05B 19/423; G05B 2219/36429; G05B 2219/40202
USPC .................................................. 700/245–264
See application file for complete search history.

(56) References Cited

U.S. PATENT DOCUMENTS

| | | | | |
|---|---|---|---|---|
| 5,798,627 A | * | 8/1998 | Gilliland | B25J 9/1671 318/568.13 |
| 7,353,082 B2 | * | 4/2008 | Pretlove | B25J 9/1664 700/264 |
| 8,315,735 B2 | * | 11/2012 | Nihei | B25J 9/1676 700/245 |
| 9,943,961 B2 | * | 4/2018 | Nakazato | B25J 9/1674 |

(Continued)

FOREIGN PATENT DOCUMENTS

| | | |
|---|---|---|
| JP | 201142011 A | 3/2011 |
| JP | 2014104527 A | 6/2014 |

(Continued)

OTHER PUBLICATIONS

Y. Fukusato, S. Sakurai, S. Wang, E. Sato-Shimokawara and T. Yamaguchi, "Domestic robot service based on ontology applying environmental information," 2009 IEEE International Conference on Fuzzy Systems, 2009, pp. 1474-1479, doi: 10.1109/FUZZY.2009.5277187. (Year: 2009).*

(Continued)

*Primary Examiner* — Jaime Figueroa
(74) *Attorney, Agent, or Firm* — Hauptman Ham, LLP

(57) ABSTRACT

A robot system that can perform cooperative work in accordance with an action of a person. A robot system according to the present disclosure includes a robot, a detection apparatus detecting a work object and detecting a predetermined action of a worker with respect to the work object, and a robot controller causing the robot to execute a predetermined work on the work object detected by the detection apparatus when the detection apparatus detects the predetermined action.

8 Claims, 15 Drawing Sheets

(56) References Cited

U.S. PATENT DOCUMENTS

| | | | |
|---|---|---|---|
| 10,406,686 B2* | 9/2019 | Boca | B25J 9/1656 |
| 10,427,306 B1* | 10/2019 | Quinlan | G06F 3/017 |
| 10,898,999 B1* | 1/2021 | Cohen | B25J 9/0003 |
| 2005/0256611 A1* | 11/2005 | Pretlove | G05B 19/42 |
| | | | 700/264 |
| 2010/0191372 A1* | 7/2010 | Nihei | B25J 9/1676 |
| | | | 700/245 |
| 2013/0144440 A1* | 6/2013 | Shimizu | B25J 11/0005 |
| | | | 700/262 |
| 2014/0135984 A1* | 5/2014 | Hirata | B25J 9/1676 |
| | | | 700/255 |
| 2015/0314442 A1* | 11/2015 | Boca | B25J 9/1656 |
| | | | 700/253 |
| 2015/0352719 A1* | 12/2015 | Nakazato | B25J 9/1674 |
| | | | 700/253 |
| 2016/0303737 A1* | 10/2016 | Rossano | B25J 9/1656 |
| 2016/0342830 A1* | 11/2016 | Ariizumi | G06F 16/285 |
| 2017/0136627 A1* | 5/2017 | Takaichi | B25J 19/04 |
| 2018/0043525 A1* | 2/2018 | Su | B25J 13/081 |
| 2018/0043549 A1* | 2/2018 | Su | B25J 9/1676 |
| 2018/0099408 A1* | 4/2018 | Shibata | B25J 9/1697 |
| 2018/0361594 A1* | 12/2018 | Haddadin | B25J 9/1656 |
| 2019/0061166 A1* | 2/2019 | Dai | G05D 1/0027 |
| 2019/0105779 A1* | 4/2019 | Einav | B25J 9/1697 |
| 2020/0012670 A1* | 1/2020 | Heckmann | G06N 5/02 |

FOREIGN PATENT DOCUMENTS

| | | |
|---|---|---|
| JP | 201544257 A | 3/2015 |
| JP | 2017-74660 A | 4/2017 |
| WO | 2017033366 A1 | 3/2017 |

OTHER PUBLICATIONS

Yusuke Fukusato, Eri Sato-Shimokawara, J. Nakazato and Toru Yamaguchi, "Service offer system using multi-phase environmental information interface," 2008 IEEE International Conference on Multisensor Fusion and Integration for Intelligent Systems, 2008, pp. 332-337, doi: 10.1109/MFI.2008.4648087. (Year: 2008).*

* cited by examiner

ROBOT SYSTEM AND ROBOT CONTROL METHOD FOR COOPERATIVE WORK WITH HUMAN

RELATED APPLICATIONS

The present application claims priority of Japanese Application Number 2018-199338, filed Oct. 23, 2018, the disclosure of which is hereby incorporated by reference herein in its entirety.

BACKGROUND OF THE INVENTION

1. Field of the Invention

The present invention relates to a robot system and a robot control method for a cooperative work with human.

2. Description of the Related Art

There is known a robot system that performs cooperative work with human (e.g., JP 2017-74660 A). So far, there is a need for a robot system that can perform cooperative work in accordance with an action of a person.

SUMMARY OF THE INVENTION

In an aspect of the present disclosure, a robot system includes a robot; a detection apparatus configured to detect a work object and a predetermined action of a person to the work object; and a robot controller configured to cause the robot to execute a predetermined work on the work object detected by the detection apparatus, when the detection apparatus detects the predetermined action.

According to the present disclosure, a worker can intuitively activate the robot at a desired timing without operating any device. Therefore, it is possible to cause the robot to perform a cooperative work so as to highly coordinate with the movement of the worker.

DETAILED DESCRIPTION

Figure 1:
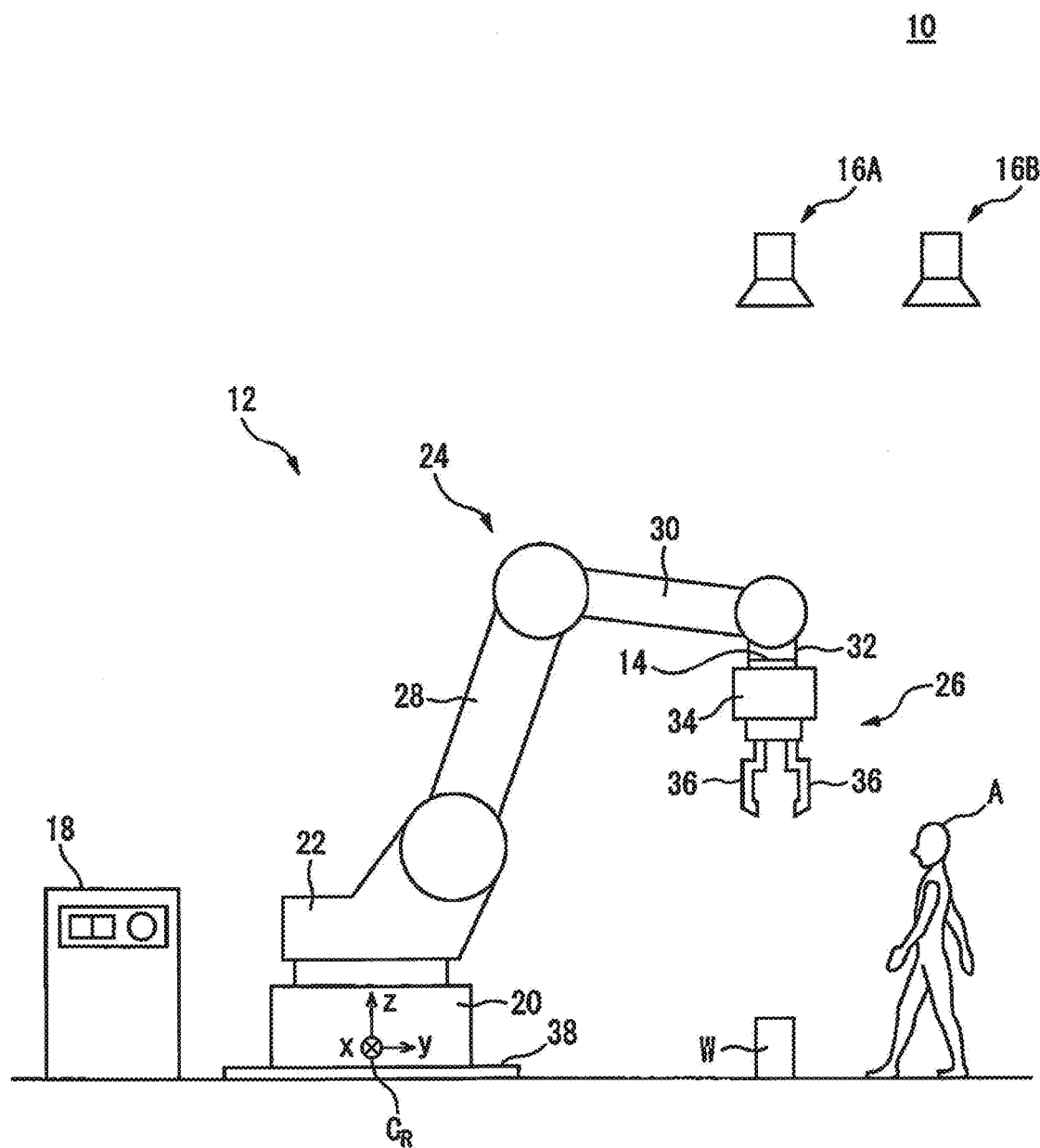
FIG. 1 is a diagram of a robot system according to an embodiment.

Hereinafter, embodiments of the present disclosure will be described in detail based on the drawings. Mote that, in the various embodiments described below, the same elements are denoted by the same reference numerals, and redundant description thereof will be omitted. First, a robot system 10 according to an embodiment will be described with reference to FIGS. 1 and 2. The robot system 10 is a system for carrying out a work of transporting a work object W to a predetermined target position in cooperation with a worker A. The robot system. 10 includes a robot 12, a force detection device 14, detection apparatuses 16A and 16B, and a control device 18. The control device 18 includes e.g. a processor (CPU, GPI), etc.) and a memory (RAM, ROM, etc.), and controls the robot. 12, the force detection device 14, and the detection apparatuses 16A and 16B.

In the present embodiment, the robot. 12 is a vertical articulated robot, and includes a robot base 20, a rotating torso 22, a robot arm 24, a wrist 32, and a robot hand 26. The robot base 20 is fixed to a base plate 38 fixed on a floor of a work cell. The rotating torso 22 is provided at the robot base 20 so as to rotate about a vertical axis. The robot arm 24 includes a lower arm 28 rotatably attached to the rotating torso 22 and an upper arm 30 rotatably attached to a distal end of the lower arm 28.

The wrist 32 is coupled to a distal end of the upper arm 30, and rotatably supports the robot hand 26. The robot hand 26 includes a hand base 34 coupled to the wrist 32 and a plurality of fingers 36 provided at the hand base 34 so as to open and close. The robot hand 26 grips or releases the work object W with the fingers 36.

Figure 2:
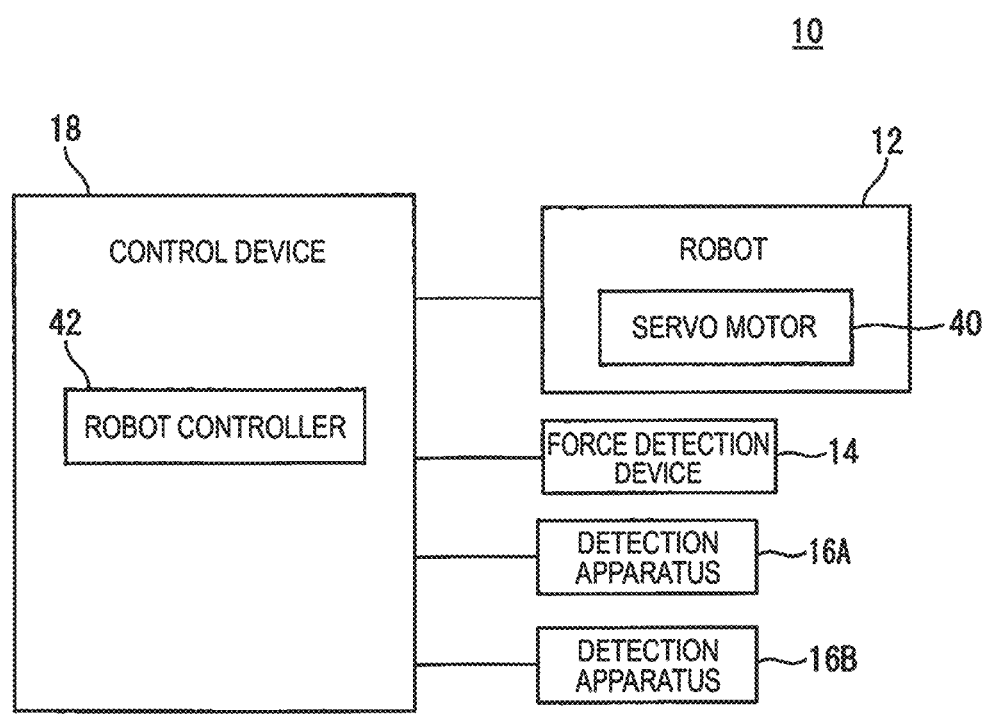
FIG. 2 is a block diagram of the robot system illustrated in FIG. 1.

The robot 12 includes a plurality of servomotors 40 (FIG. 2). The servomotors 40 are built in the respective components of the robot 12 (i.e., the robot base 20, the rotating torso 22, the robot arm 24, and the wrist 32), and rotate these components about the drive axes.

The force detection device 14 is interposed between the wrist. 32 and the robot hand 26. In the present embodiment, the force detection device 14 includes a six-axis force sensor having a plurality of strain gauges (not illustrated), and is configured to detect an external force applied to the robot hand 26. Note that the force detection device 14 is not limited to the six-axis force sensor, but may include any type of device which can detect the external force applied to the robot hand 26.

The detection apparatus 16A is configured to detect the work object W. Specifically, the detection apparatus 16A is fixed at a predetermined position in the work cell, and configured to image the work object W and detect the position of the work object W in a robot coordinate system $C_R$ based on the captured image. Note that, in this disclosure, the "position" of the work object and the robot may mean the position and orientation thereof.

The detection apparatus 16B is configured to detect a predetermined action of the worker A to the work object W. Specifically, the detection apparatus 16B images the worker A and detects the predetermined action of the worker A to the work object W based on the captured image (so-called optical motion capture). The predetermined action of the worker A to be detected by the detection apparatus 16B will be described later. For example, the detection apparatuses 16A and 16B may be comprised of a three-dimensional visual sensor including an image sensor, an optical lens such as a focus lens, and an image processor (e.g., a GPU), etc.

Figure 3:
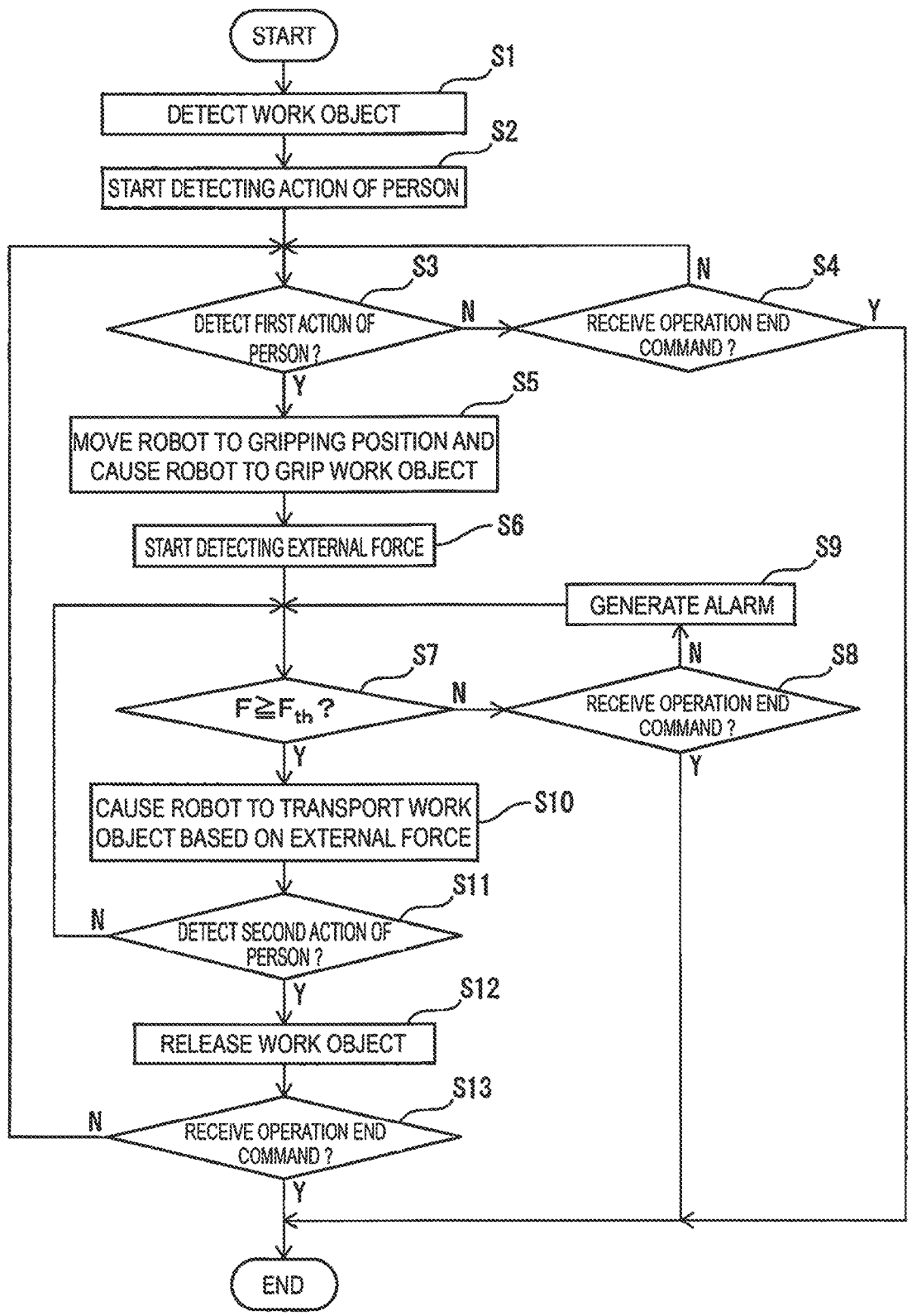
FIG. 3 is a flow chart illustrating an example of the operation flow of the robot system illustrated in FIG. 1.
Figure 4:
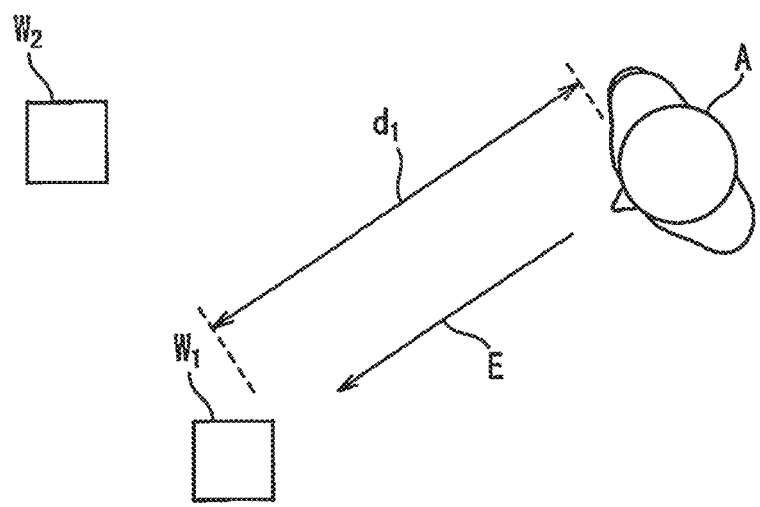
FIG. 4 is a diagram for illustrating an example of a first action of a worker.
Figure 4:
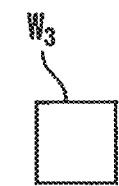
Figure 4:
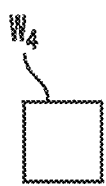
Figure 4:
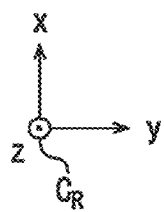

Next, the operation of the robot system 10 will be described with reference to FIG. 3. The operation flow illustrated in FIG. 3 is started when the control device 18 receives an operation start command from an operator, a host controller, or a robot program. In this embodiment, when the operation flow illustrated in FIG. 3 is started, a plurality of work objects $W_1$ to $W_4$ are placed at random as illustrated in FIG. 4.

In step S1, the detection apparatus 16A detects each of the work objects $W_1$ to $W_4$. Specifically, the control device 18 sends a position detection command to the detection apparatus 16A, in response to which, the detection apparatus 16A images each of the work objects $W_1$ to $W_4$, and acquires the position of each of the work objects $W_1$ to $W_4$ in the robot coordinate system $C_R$, based on the captured image.

In step S2, the detection apparatus 16B starts to detect the action of the worker A. Specifically, the control device 18 sends an action detection command to the detection apparatus 16B, in response to which, the detection apparatus 16B consecutively images the worker A (e.g., at a predetermined cycle), and consecutively detects the action of the worker A based on the captured image.

In this respect, the detection apparatus 16B is configured to detect a first action and a second action of the worker A. The first action is a predetermined action performed by the worker A to the work object W to be gripped by the robot 12 in order to cause the robot 12 to carry out the work of gripping the work object W. Examples of the first action will be described with reference to FIGS. 4 to 7.

In the example illustrated in FIG. 4, the first action is defined as an action of the worker A approaching one work object $W_1$ to be gripped by the robot 12. The detection apparatus 16B consecutively images the worker A, and calculates a distance $d_1$ between the worker A and the work object $W_1$, a distance $d_2$ between the worker A and the work object $W_2$, a distance $d_3$ between the worker A and the work object $W_3$, and a distance $d_4$ between the worker A and the work object $W_4$, from the captured image and the information on the position of each of the work objects $W_1$ to $W_4$ acquired in above-described step S1.

Then, the detection apparatus 16B determines whether or not each of the calculated distances $d_1$ to $d_4$ is equal to or less than a predetermined threshold value $d_{th1}$. When one of the distances $d_1$ to $d_4$ becomes equal to or less than the threshold value $d_{th1}$, as a first action, the detection apparatus 16B detects that the worker A approaches the one of the work objects $W_1$ to $W_4$.

In the example illustrated in FIG. 4, the worker A approaches the work object $W_1$, and the detection apparatus 16B detects the first action of the worker A approaching the work object $W_1$ when the distance $d_1$ is equal to or less than the threshold value $d_{th1}$, and identifies the work object $W_1$ as a target to be gripped by the robot 12. Alternatively, the detection apparatus 16B may calculate a movement direction E of the worker A from the consecutively captured image, and identify the work object $W_1$ intersecting with the movement direction E, as the target to be gripped by the robot 12.

Figure 5:
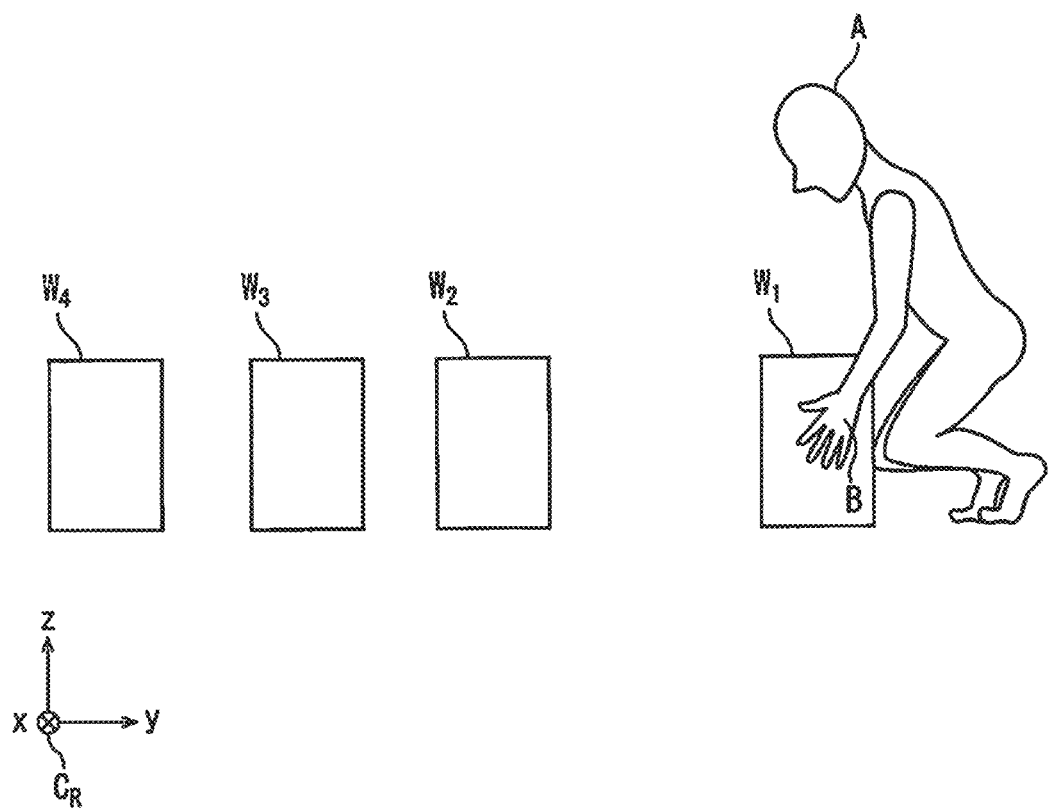
FIG. 5 is a diagram for illustrating another example of the first action of the worker.

In the example illustrated in FIG. 5, the first action is defined as an action of the worker A gripping one work object $W_1$ to be gripped by the robot 12 with his/her hand B. The detection apparatus 16B consecutively images the worker A, detects the first action of the worker A gripping the work object $W_1$ using a so-called motion capture technology, and identifies the work object $W_1$ gripped by the worker A as the target to be gripped by the robot 12.

As an example, the detection apparatus 16B records (or performs machine learning of) a reference action pattern of an action of the worker A gripping the work object $W_1$. The detection apparatus 16B determines whether or not the actual action of the worker A matches the reference action pattern when monitoring the action of the worker A after the start of the step S2. The detection apparatus 16B detects that the worker A performs the first action of gripping the work object $W_1$ when it determines that the actual action of the worker A matches the reference action pattern.

Figure 6:
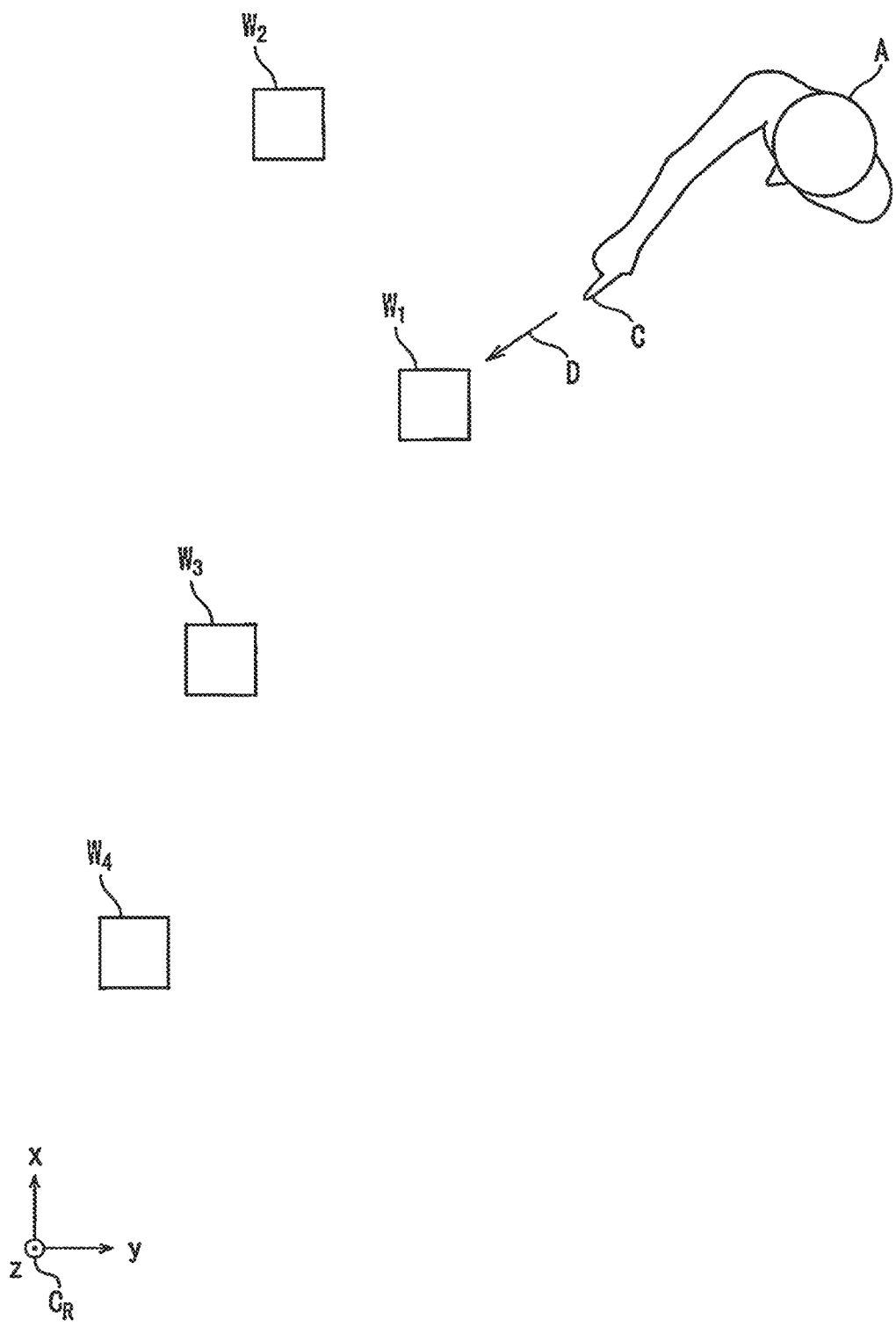
FIG. 6 is a diagram for illustrating still another example of the first action of the worker.

In the example illustrated in FIG. 6, the first action is defined as an action of the worker A pointing to one work object $W_1$ to be gripped by the robot 12 with his/her finger C. The detection apparatus 16B consecutively images the worker A, and detects the action of the worker A pointing to the work object $W_1$, as well as a pointing direction D in which the worker A points to the work object $W_1$, using the motion capture technology. The detection apparatus 16B identifies the work object $W_1$ intersecting with the pointing direction D, as the target to be gripped by the robot 12.

Figure 7:
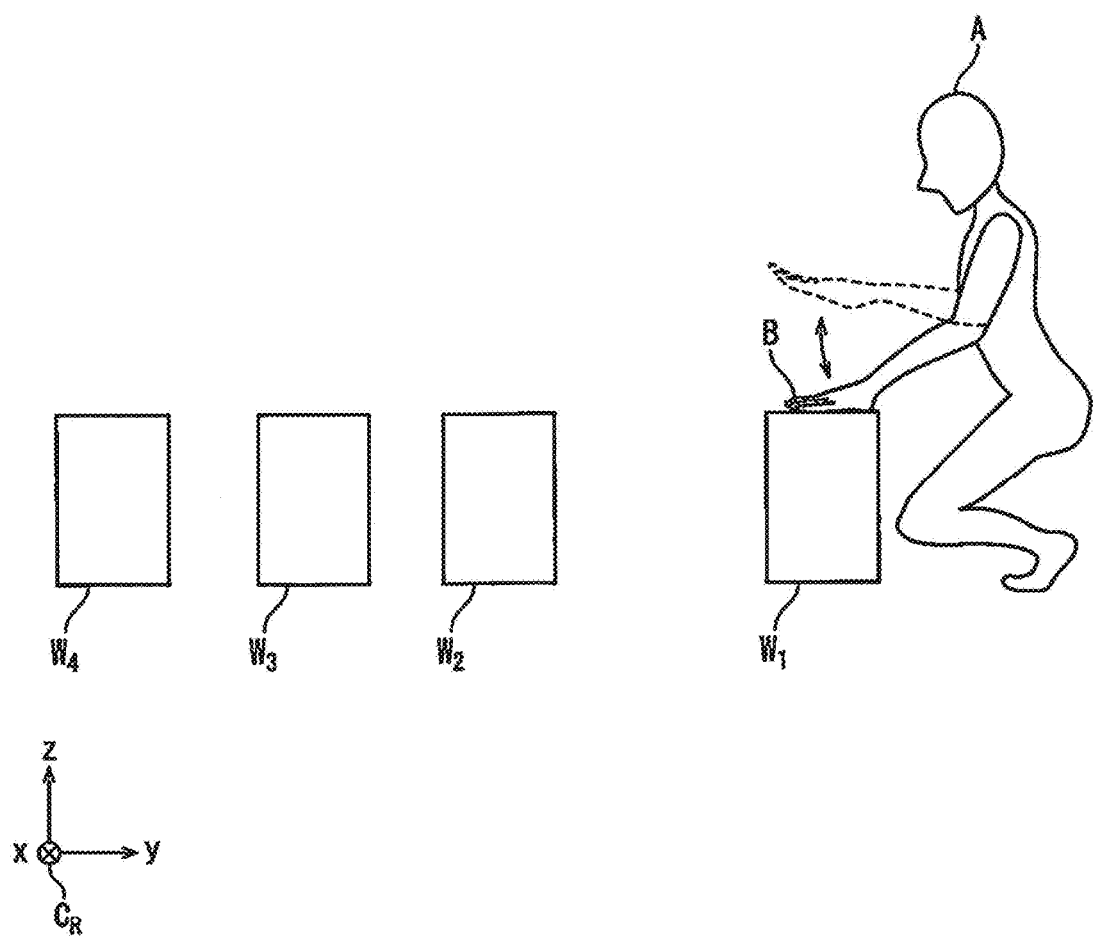
FIG. 7 is a diagram for illustrating still another example of the first action of the worker.

In the example illustrated in FIG. 7, the first action is defined as an action of the worker A tapping one work object $W_1$ to be gripped by the robot 12 with his/her hand B. The detection apparatus 16B consecutively images the worker A, and detects the action of the worker A tapping the work object $W_1$, using the motion capture technology. The detection apparatus 16B identifies the tapped work object $W_1$ as the target to be gripped by the robot 12.

In this case, the worker A may tap the work object $W_1$ for a predetermined number of times n ("n" is an integer of 2 or greater), and the detection apparatus 16B may detect the first action when it detects that the worker A taps the work object $W_1$ for the n times. Note that the second action of the worker A detected by the detection apparatus 16B will be described later.

In step S3, the detection apparatus 16B determines whether or not it detects the first action of the worker A. Specifically, the detection apparatus 16B determines whether or not it detects the first action of the worker A as described with reference to FIGS. 4 to 7 for example. When the detection apparatus 16B detects the first action of the worker A, it determines YES and identifies the work object $W_1$ as the target to be gripped by the robot 12. Then, the detection apparatus 16A sends to the control device 18 the information on the position in the robot coordinate system $C_R$ of the work object $W_1$ identified as the gripping target by the detection apparatus 16B, and then, the process proceeds to step S5. On the other hand, when the detection apparatus 16B does not detect the first action, it determines NO and the process proceeds to step S4.

In step S4, the control device 18 determines whether or not it receives an operation end command from the operator, the host controller, or the robot program. The control device 18 ends the flow illustrated in FIG. 3 when determining that it receives the operation end command (i.e., determining YES), while the control device 18 returns to step S3 when determining that it does not receive the operation end command (i.e., determining NO).

In step S5, the control device 18 moves the robot 12 to a position for gripping the work object $W_1$ (hereinafter, referred to as a gripping position), and causes the robot 12 to grip the work object $W_1$. Specifically, the control device 18 sends a command to each servomotor 40 of the robot 12 based on the information of the position of the work object $W_1$ received from the detection apparatus 16A in above-described step S3, and moves the robot 12 to the gripping position.

When the robot 12 is disposed at the gripping position, the work object $W_1$ is disposed between the fingers 36 of the robot hand 26. In this manner, the control device 18 is triggered by the fact that the detection apparatus 16B detects the first action of the worker A and starts the work of moving the robot 12 to the gripping position (i.e., sending the command to each servomotor 40).

Then, the control device 18 operates the robot hand 26 to close the fingers 36. Whereby, the robot 12 grips the work object $W_1$ with the robot hand 26. Thus, in this embodiment, the control device 18 functions as a robot controller 42 (FIG. 2) configured to cause the robot 12 to execute a predetermined work (work of moving the robot 12 to the gripping position and gripping the work object $W_1$), when the detection apparatus 16B detects the first action of the worker A.

In this step S5, the control device 18 may calculate the movement path of the robot 12 that can avoid collision with the worker A, based on the information of the action of the worker A consecutively detected by the detection apparatus 16B. For example, the control device 18 acquires data indicating the movement path of the worker A from the detection apparatus 16B, and calculates the movement path of the robot 12 that avoids (does not intersect) the movement path of the worker A. Then, the control device 18 moves the robot 12 along the calculated movement path. According to this configuration, a collision between the robot 12 and the worker A can be avoided.

When the work of gripping the work object $W_1$ by the robot 12 is completed in step S5, the worker A applies an external force F to the robot 12 in order to transport the work object $W_1$ to the target position in cooperation with the robot 12. As an example, the worker A lifts the work object $W_1$ gripped by the robot 12, and pushes the work object $W_1$ in the direction toward the target position. The external force F applied by the worker A to the work object W at this time is also applied to the robot hand 26 via the work object $W_1$.

As another example, the worker A may apply the external force F directly to the robot hand 26 with his/her hand B. In this case, the robot hand 26 (e.g., the hand base 34) may be provided with a handle (not illustrated) to be gripped by the worker A, and the worker A may grip the handle with his/her hand B to apply the external force F to the robot hand 26 through the handle.

In this embodiment, after the completion of step S5, the control device 18 switches the control of the robot 12 from the position following control (step S2 to S5) for causing the robot 12 to approach the target position detected by the detection apparatus 16A so as to follow the action of the worker A detected by the detection apparatus 16B, to the lead through control (step S6 to S10 described below) for controlling the robot 12 in accordance with the external force F applied to the robot 12.

In step S6, the control device 18 start to detect the external force F applied to the robot 12. Specifically, the control device 18 starts an operation of consecutively (e.g., periodically) acquiring from the force detection device 14 the data of the external force F detected by the force detection device 14. The external force F (magnitude and direction) applied to the robot 12 by the worker A via the work object $W_1$ (or directly with the hand B) is detected by the force detection device 14.

In step S7, the control device 18 determines whether or not the external force F most-recently detected by the force detection device 14 is equal to or greater than a predetermined threshold value $F_{th}$. When the control device 18 determines that the most-recent external force F satisfies $F \geq F_{th}$ (i.e., determines YES), it proceeds to step S10, whereas, when the control device 18 determines that $F < F_{th}$ (i.e., determines NO), it proceeds to step S6.

In step S8, the control device 18 determines whether it receives the operation end command, similarly as the above-described step S4. When the control device 18 determines that it receives the operation end command (i.e., determines YES), it ends the flow illustrated in FIG. 3, whereas, when the control device 18 determines that it does not receive the operation end command (i.e., determines NO), it proceeds to step S9.

In step S9, the control device 18 generates an alarm signal. For example, the control device 18 may generate the alarm signal in the form of a voice or image indicating "Please guide robot to target position", and output the alarm through a speaker or display (not illustrated). After step S9, the control device 18 returns to step S7.

In step S10, the control device 18 causes the robot 12 to transport the work object $W_1$ based on the data of the external force F most-recently detected by the force detection device 14. Specifically, the control device 18 acquires the direction of the external force F most-recently detected by the force detection device 14, and controls the robot 12 to move the robot hand 26 gripping the work object $W_1$ in the direction of the external force F.

The control device 18 may acquire the magnitude of the external force F most-recently detected by the force detection device 14, and control the speed at which the robot hand 26 is moved in the direction of the external force F in response to the magnitude of the external force F. For example, the control device 18 may control the movement speed of the robot hand 26 so as to increase it as the magnitude of the external force F increases.

Figure 8:
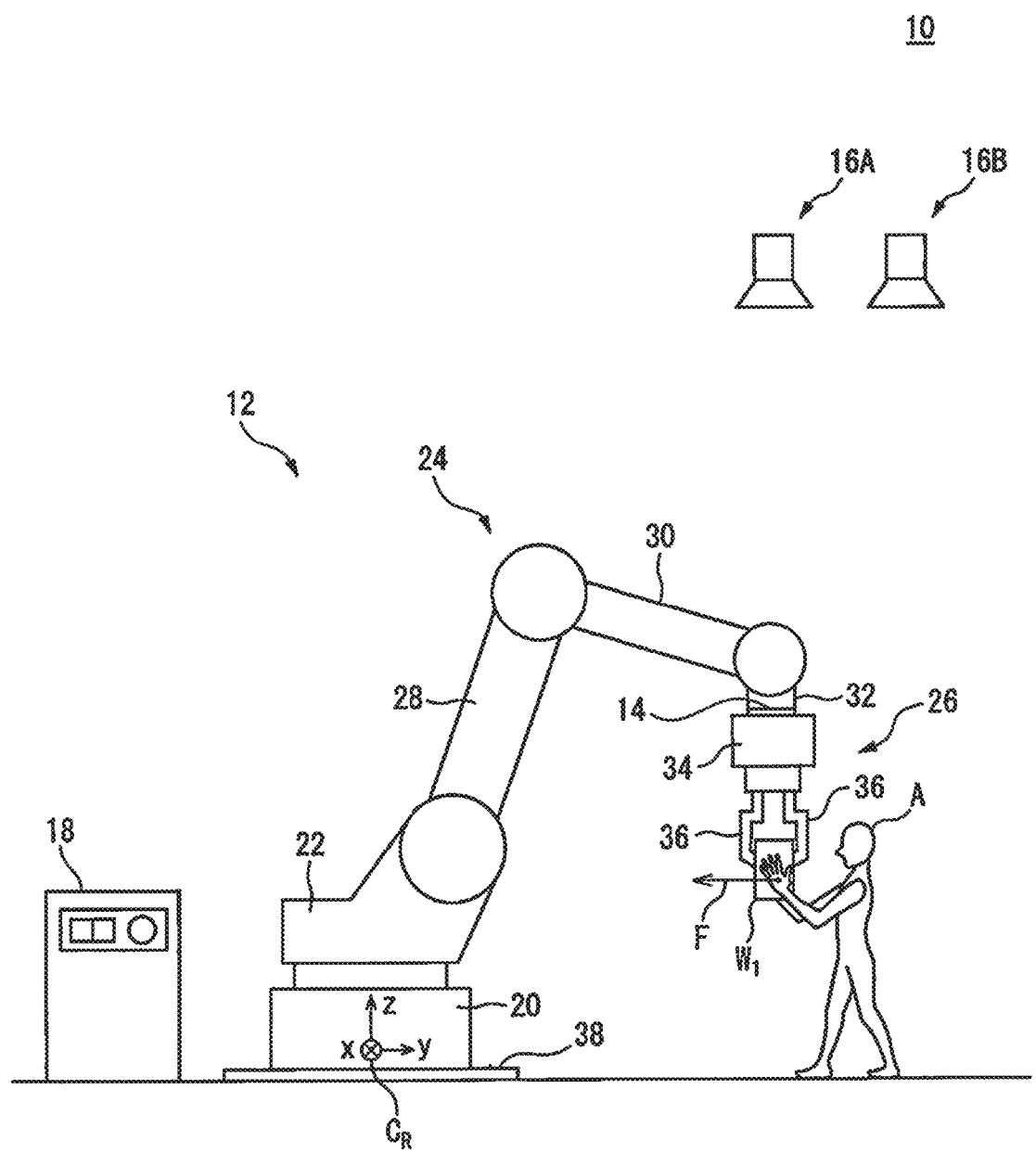
FIG. 8 illustrates a state in which the worker is transporting the work object in cooperation with the robot in step S10 in FIG. 3.

Due to this, as illustrated in FIG. 8, the robot 12 moves the work object $W_1$ in accordance with the external force F applied to the robot 12 by the worker A. FIG. 8 shows an example where the worker A grips the work object $W_1$ with his/her hand B together with the robot 12, and applies the external force F to the robot 12 via the work object $W_1$. In this way, the robot 12 transports the work object $W_1$ toward the target position in cooperation with the worker A.

Note that, the control device 18 may determine whether or not the external force F detected by the force detection device 14 exceeds an upper limit value $F_{MAX}$ during execution of step S10, and urgently stop the operation of the robot 12 when the external force F exceeds the upper limit value $F_{MAX}$ (i.e., $F \geq F_{MAX}$). The upper limit value $F_{MAX}$ is predetermined by the user as a value larger than the above-mentioned threshold value $F_{th}$ in order to detect that the robot hand 26 or the work object $W_1$ collides with the obstacle during execution of step S10.

When the work object $W_1$ is moved to the target position, the worker A performs the second action. The second action is a predetermined action performed by the worker A for causing the robot 12 to release the work object $W_1$, which is different from the first action described above. Examples of the second action will be described with reference to FIGS. 9 and 10.

Figure 9:
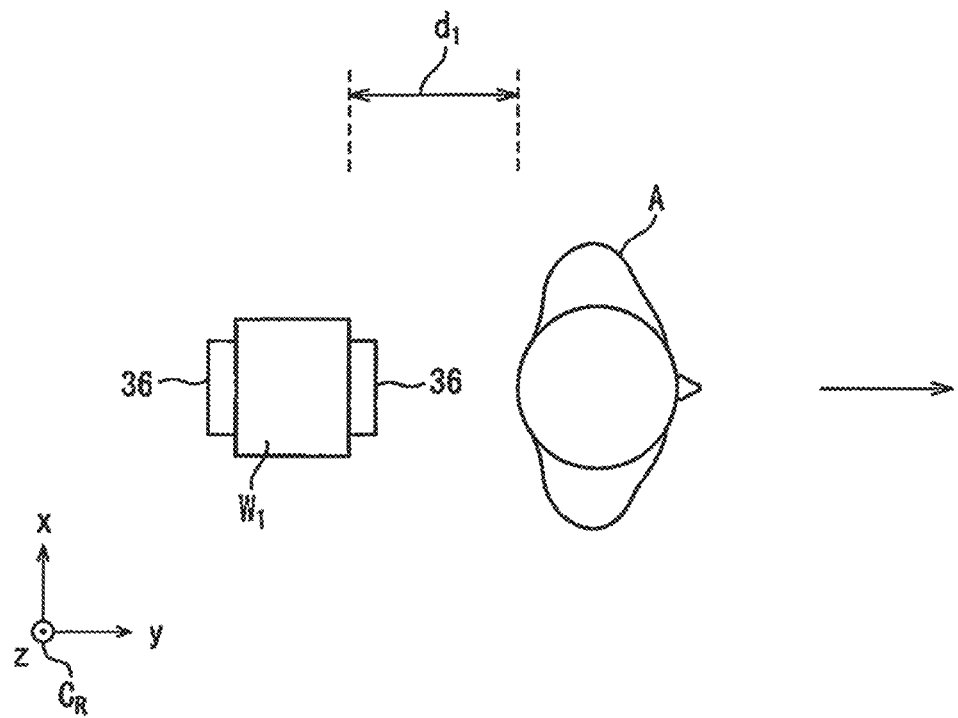
FIG. 9 is a diagram for illustrating an example of a second action of the worker.

In the example illustrated in FIG. 9, the second action is defined as an action of the worker A going away from the work object $W_1$ gripped by the robot 12. For example, the detection apparatus 16B consecutively images the worker A and the work object $W_1$, and calculates the distance $d_1$ between the worker A and the work object $W_1$ from the captured image. The detection apparatus 16B may start to calculate the distance $d_1$ between the worker A and the work object $W_1$ when step S5 is completed or when step S10 is started.

The detection apparatus 16B determines whether or not the calculated distance $d_1$ is equal to or greater than a predetermined threshold value $d_{th2}$. The detection apparatus 16B detects, as the second action, that the worker A goes away from the work object $W_1$, when the distance $d_1$ is equal to or greater than the threshold value $d_{th2}$. Note that, the threshold value $d_{th2}$ may be the same value as the above-described threshold value $d_{th1}$ or may be a different value.

Figure 10:
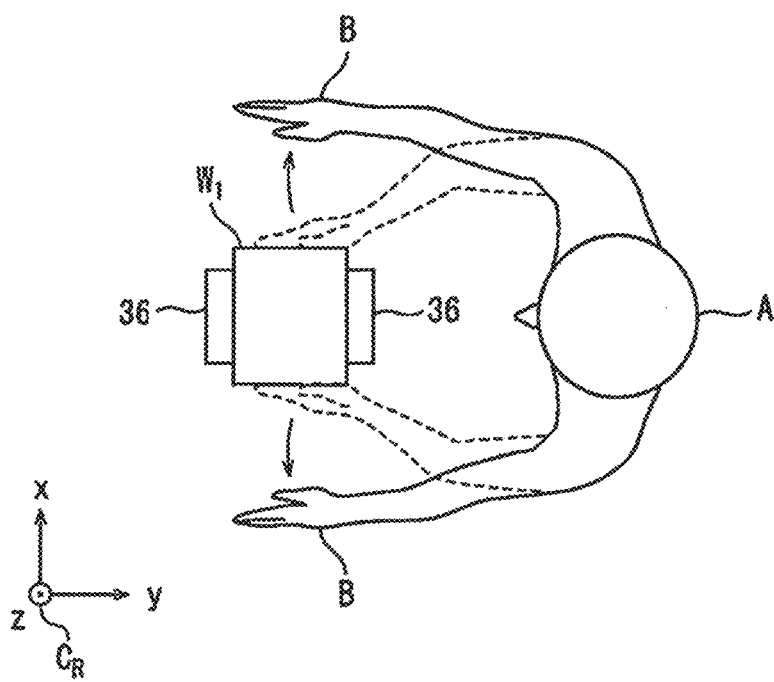
FIG. 10 is a diagram for illustrating another example of the second action of the worker.

In the example illustrated in FIG. 10, the second action is defined as an action of the worker A opening his/her hand B, which has been gripping the work object $W_1$, to release the work object $W_1$. The detection apparatus 16B consecutively images the worker A and detects the action of the worker A opening his/her hand B gripping the work object $W_1$, using a so-called motion capture technology.

As an example, the detection apparatus 16B stores (or performs machine learning of) a reference action pattern of the action of the worker A opening his/her hand B, which has been gripping the work object $W_1$. When the detection apparatus 16B monitors the action of the worker A during execution of step S10, it determines whether or not the actual action of the worker A matches the reference action pattern. When determining that the actual action of the worker A matches the reference action pattern, the detection apparatus 16B detects that the worker A has performed the second action of opening his/her hand B.

In step S11, the detection apparatus 16B determines whether or not it detects the second action of the worker A. Specifically, the detection apparatus 16B determines whether or not it detects the second action of the worker A as described in FIGS. 9 and 10 for example. The detection apparatus 16B determines YES when it detects the second action, and proceeds to step S12. On the other hand, when the detection apparatus 16B does not detect the second action of the worker A, it determines NO and returns to step S7.

As described above, in this embodiment, the detection apparatus 16B detects the first action performed by the worker A before the work object $W_1$ is transported, and the second action performed by the worker A when the work object $W_1$ is transported to the target position. Accordingly, the detection apparatus 16B is installed at a position where it can detect at least the worker A before transporting the work object $W_1$ and the worker A when transporting the work object $W_1$ to the target position.

In step S12, the control device 18 causes the robot 12 to release the work object $W_1$. Specifically, the control device 18 operates the robot hand 26 to open the fingers 36. Whereby, the robot hand 26 releases the work object $W_1$ gripped by the robot hand 26. As a result, the work object $W_1$ is placed at the target position.

Note that, when it is determined YES in step S11, in this step S12, the control device 18 may operate the robot 12 in accordance with the robot program so as to move the work object $W_1$ gripped by the robot 12 in a predetermined direction (e.g., vertically downward) before releasing the work object $W_1$.

For example, assume that the worker A performs the second action when the robot 12 moves the work object $W_1$ vertically upward of a placement table which is the target position. When the second action is detected in step S11, the control device 18 operates the robot 12 to move the work object $W_1$ vertically downward in step S12, and release the work object $W_1$ when the work object $W_1$ is placed on the placement table.

In this regard, the control device 18 may monitor the external force detected by the force detection device 14 when moving the work object $W_1$ vertically downward by the robot 12, and detect whether or not the work object $W_1$ is in contact with the placement table based on the data of the external force. Then, the control device 18 may cause the robot 12 to release the work object $W_1$ when detecting that the work object $W_1$ contacts the placement table.

In step S13, the control device 18 determines whether it receives the operation end command, similarly as above-described step S4. When the control device 18 determines that it receives the operation end command (i.e., determines YES), the control device 18 ends the flow illustrated in FIG. 3, whereas, when the control device 18 determines that it does not receives the operation end command (i.e., determines NO), it returns to step S3.

Then, the worker A again performs the first action on any of the other work objects $W_2$ to $W_4$, and the control device 18 repeatedly executes the loop of steps S3 to step S13 so as to cause the robot 12 to sequentially transport the work objects $W_2$ to $W_4$ to the target position in cooperation with the worker A.

As described above, in this embodiment, the control device 18 causes the robot 12 to execute a predetermined work (movement to the gripping position and gripping) on the work object W when the detection apparatus 16B detects the first action of the worker A. According to this configuration, the worker A can intuitively activate the robot 12 at a desired timing without operating any device. Therefore, it is possible to cause the robot 12 to perform a cooperative work so as to highly coordinate with the movement of the worker A.

Further, in this embodiment, after step S5 is completed, the control device 18 switches from the position following control (step S2 to S5) based on the detection data by the detection apparatus 16B to the lead through control (step S6 to S10) based on the detection data by the force detection device 14. According to this configuration, it is possible to smoothly carry out a series of work activating the robot 12 by the first action of the worker A and transporting the work object $W_1$ to the target position in cooperation with the robot 12.

Further, in this embodiment, the control device 18 causes the robot 12 to release the work object $W_1$ when the detection apparatus 16B detects the second action of the worker A. According to this configuration, the worker A can intuitively cause the robot 12 to release the work object $W_1$ at the timing when the work object $W_1$ is transported to the target position, without operating any device.

In this embodiment, the detection apparatus 16A detects the position of the work objects $W_1$ to $W_4$ in the robot coordinate system $C_R$. However, the work objects $W_1$ to $W_4$ may be disposed at predetermined positions in the robot coordinate system $C_R$ by a jig or the like, and the control device 18 may pre-store the positions of these work objects $W_1$ to $W_4$ in the robot coordinate system $C_R$, for example.

In this case, in step S1, the detection apparatus 16A may not acquire the positions of the work objects $W_1$ to $W_4$ in the robot coordinate system $C_R$, but may only detect the presence of the work objects $W_1$ to $W_4$. Then, in step S3, the detection apparatus 16B identifies the work object $W_1$ which is the target of the first action of the worker A, and in step S5, the control device 18 may move the robot 12 to the gripping position based on the pre-stored position information of the work object $W_1$.

Further, in the flow illustrated in FIG. 3, the control device 18 may execute the above-described step S6 before the step S5 (e.g., at a timing immediately before or after step S2), and during the execution of step S5, when the external force F detected by the force detection device 14 exceeds the upper limit value $F_{MAX}$, the control device 18 may determine that the robot hand 26 collides with the worker A, and urgently stop the robot 12.

In this case, when determining that the robot 12 collides with the worker A, the control device 18 may generate an alarm signal in the form of voice or image indicating the collision between the robot 12 and the worker A, and output the alarm through the speaker or display.

Further, the force detection device 14 may be omitted from the robot system 10. In this case, instead of steps S6 to S12 in FIG. 3, the control device 18 may operate the robot 12 in accordance with the robot program so as to cause the robot 12 to automatically transport the work object $W_1$ to the target position.

This robot program can be constructed e.g. by teaching the robot 12 to transport the work object $W_1$ to the target position. Further, the first action or the second action of the worker A is not limited to the above-described action, but may be any action as long as the detection apparatus 16B can detect it.

Figure 11:
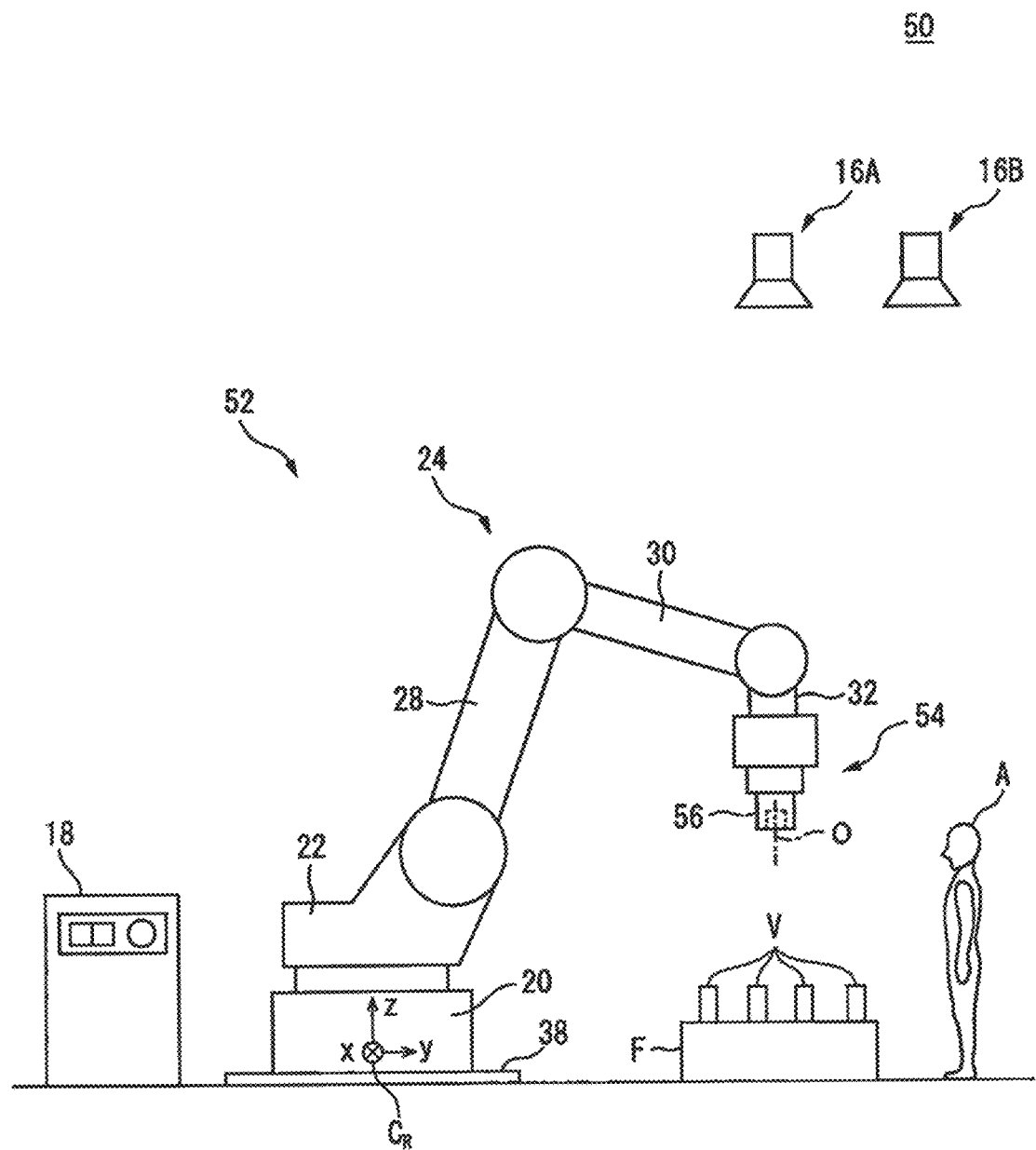
FIG. 11 is a diagram of a robot system according to another embodiment.
Figure 12:
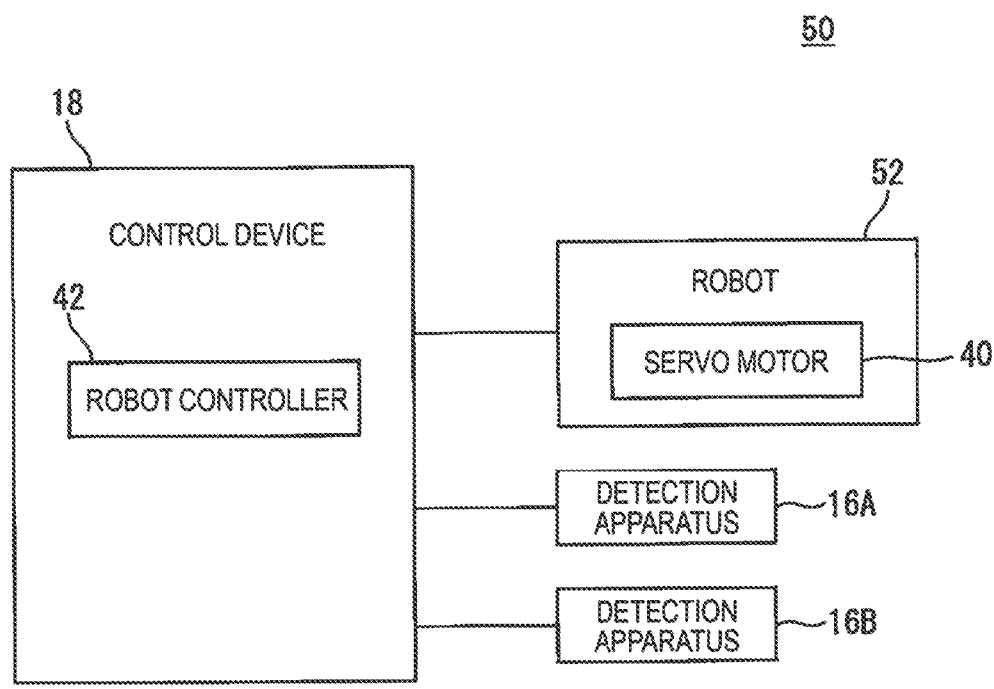
FIG. 12 is a block diagram of the robot system illustrated in FIG. 11.

Next, a robot system 50 according to another embodiment will be described with reference to FIGS. 11 and 12. The robot system 50 is for executing a work of fastening work objects V to a member F in cooperation with the worker A. The robot system 50 differs from the above-described robot system 10 in that it does not include the force detection device 14, and in the configuration of a robot 52.

The robot 52 is a vertical articulated robot, and includes the robot base 20 the rotating torso 22, the robot arm 24, the wrist 32, and an end effector 54. The end effector 54 is attached to the wrist 32, and includes a tool 56. The tool 56 has an axis O, and the end effector 54 drives the tool 56 to rotate about the axis O. The work object V is e.g. a bolt, and the end effector 54 rotates the tool 56 in a state where the tool 56 engages the work object V, whereby fastening the work object V to the member F.

Figure 13:
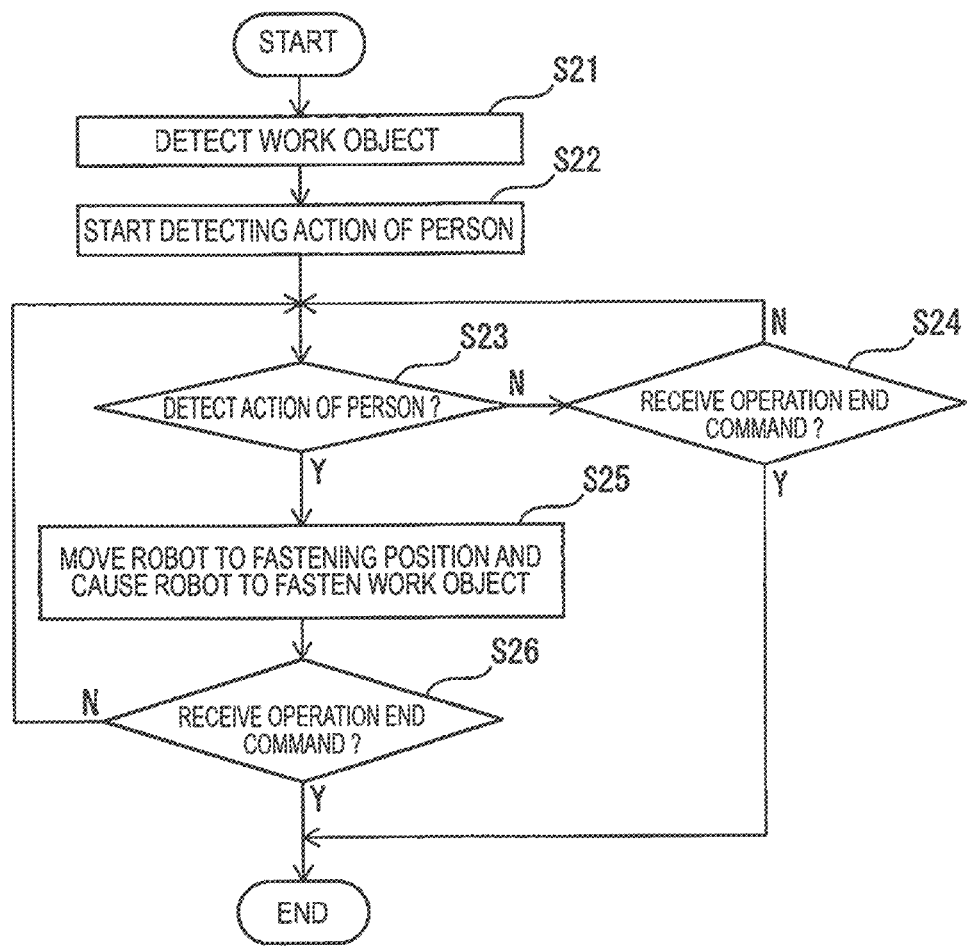
FIG. 13 is a flow chart illustrating an example of the operation flow of the robot system illustrated in FIG. 11.
Figure 14:
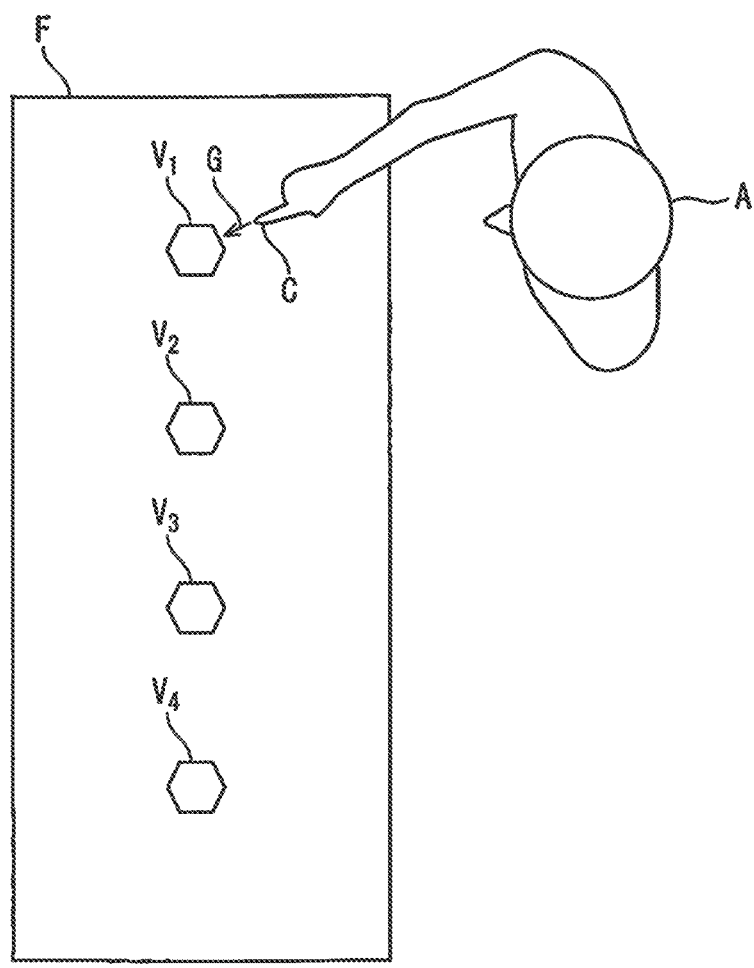
FIG. 14 is a diagram for illustrating an example of a predetermined action of the worker.

Next, the operation of the robot system 50 will be described with reference to FIG. 13. The operation flow illustrated in FIG. 13 is started when the control device 18 receives an operation start command from an operator, a host controller, or a robot program. In this embodiment, as illustrated in FIG. 14, a plurality of work objects $V_1$ to $V_4$ are placed on the member F.

In step S21, the detection apparatus 16A detects each of the work objects $V_1$ to $V_4$. Specifically, the control device 18 sends a position detection command to the detection apparatus 16A. When receiving the position detection command from the control device 18, the detection apparatus 16A images each of the work objects $V_1$ to $V_4$, and acquires the position (e.g., the center) of each of the work objects $V_1$ to $V_4$ in the robot coordinate system $C_R$, based on the captured image.

In step S22, the detection apparatus 16B starts to detect the action of the worker A. Specifically, the control device 18 sends an action detection command to the detection apparatus 16B. When receiving the action detection command, the detection apparatus 16B consecutively images the worker A, and consecutively detects the action of the worker A based on the captured images.

The detection apparatus 16B is configured to detect a predetermined action of the worker A. This predetermined action is an action performed by the worker A to the work object V to be fastened, in order to cause the robot 52 to execute the fastening work of the work object V. An example of this predetermined action will be described with reference to FIG. 14.

In the example illustrated in FIG. 14, the predetermined action is defined as an action of the worker A pointing to one work object $V_1$ to be fastened with his/her finger C. The detection apparatus 16B consecutively images the worker A, and detects the action of the worker A pointing to the work object $V_1$, as well as a pointing direction G, using so-called motion capture technology. Then, the detection apparatus 16B identifies the work object $V_1$ intersecting with the detected pointing direction G as a fastening target.

In step S23, the detection apparatus 16B determines whether or not it detects the predetermined action of the worker A. Specifically, the detection apparatus 16B determines whether or not it detects the action of the worker A as described in FIG. 14 for example. When detecting the action of the worker A, the detection apparatus 16B determines YES, and identifies the work object $V_1$ as the fastening target.

Then, the detection apparatus 16A sends to the control device 18 information on the position in the robot coordinate system $C_R$ of the work object $V_1$ identified as the fastening target, and proceeds to step S25. On the other hand, when the detection apparatus 16B does not detect the predetermined action of the worker A, it determines NO and proceeds to step S24.

In step S24, the control device 18 determines whether or not it receives the operation end command, similarly as above-described step S4. When the control device 18 determines that it receives the operation end command (i.e., determines YES), the control device 18 ends the flow illustrated in FIG. 13. On the other hand, when the control device 18 determines that it does not receive the operation end command (i.e., determines NO), it returns to step S23.

In step S25, the control device 18 functions as the robot controller 42 to move the robot 52 to a position for fastening the work object $V_1$ (hereinafter, referred to as the "fastening position"), and cause the robot 52 to fasten the work object $V_1$ to the member F. Specifically, the control device 18 sends a command to each servomotor 40 of the robot 52 based on the information on the position of the work object $V_1$, which has been received from the detection apparatus 16A in the above-described step S23, and moves the robot 52 to the fastening position.

When the robot 52 is disposed at the fastening position, the axis O of the tool 56 and the central axis of the work object $V_1$ coincide with each other, and the tool 56 engages the work object $V_1$ so as not to relatively rotate. As described above, the control device 18 is triggered by the fact that the detection apparatus 16B detects the predetermined action of the worker A, and starts a work (i.e., a command to the servomotor 40) of moving the robot 52 to the fastening position.

Then, the control device 18 operates the end effector 54 so as to rotate the tool 56 about the axis O. As a result, the work object $V_1$ is rotated by the tool 56 so as to be fastened to the member F. Note that, in this step S25, the control device 18 may calculate the operation path of the robot 52 that can avoid collision with the worker A, based on the information on the action of the worker A consecutively detected by the detection apparatus 16B. Then, the control device 18 may move the robot 52 along the calculated operation path. According to this configuration, a collision between the robot 52 and the worker A can be prevented.

In step S26, the control device 18 determines whether it receives the operation end command, similarly as the above-described step S4. When the control device 18 determines that it receives the operation end command (i.e., determines YES), the control device 18 ends the flow illustrated in FIG. 13. On the other hand, when the control device 18 determines that it does not receive the operation end command (i.e., determines NO), the control device 18 returns to step S23.

Then, the worker A performs the first action to any of the other work objects $V_2$ to $V_4$ again, and the control device 18 repeatedly executes the loop of steps S23 to S26, whereby causing the robot 52 to execute the fastening work on the work objects $V_2$ to $V_4$ in cooperation with the worker A.

As described above, in this embodiment, when the detection apparatus 16B detects the predetermined action of the worker A, the control device 18 causes the robot 52 to execute the predetermined work (moving to the fastening position and fastening the work object) on the work object V. According to this configuration, the worker A can intuitively activate the robot 52 at a desired timing without operating any device.

Note that, in this embodiment, the predetermined action of the worker A detected by the detection apparatus 16B may be the approaching action illustrated in FIG. 4, the gripping action illustrated in FIG. 5, or the tap action illustrated in FIG. 7. Further, the robot 52 in this embodiment performs the work of fastening the work object V, but may perform e.g. a welding work on a work object or any other work. If the robot 52 performs the welding work, the end effector 54 of the robot 52 may include a welding torch.

In the above embodiments, the robot 12, 52 performs the work on a plurality of work objects W, V, but may perform the work on only one work object. Also, the detection apparatus 16B may be configured by a camera and the processor of the control device 18. Specifically, the camera may image the worker A, and the processor of the control device 18 may analyze the image captured by the camera so as to detect the action of the worker A.

In addition, the detection apparatus 16B is not limited to the 3D visual sensor, but may include a plurality of inertial sensors attached to the body of the worker A. In this case, the control device 18 may detect the action of the worker A based on output data from the plurality of inertial sensors. Further, the detection apparatus 16B is not limited to the above embodiments, but may include any type of sensor detect the action of the worker A using any type of motion capture technology.

Figure 15:
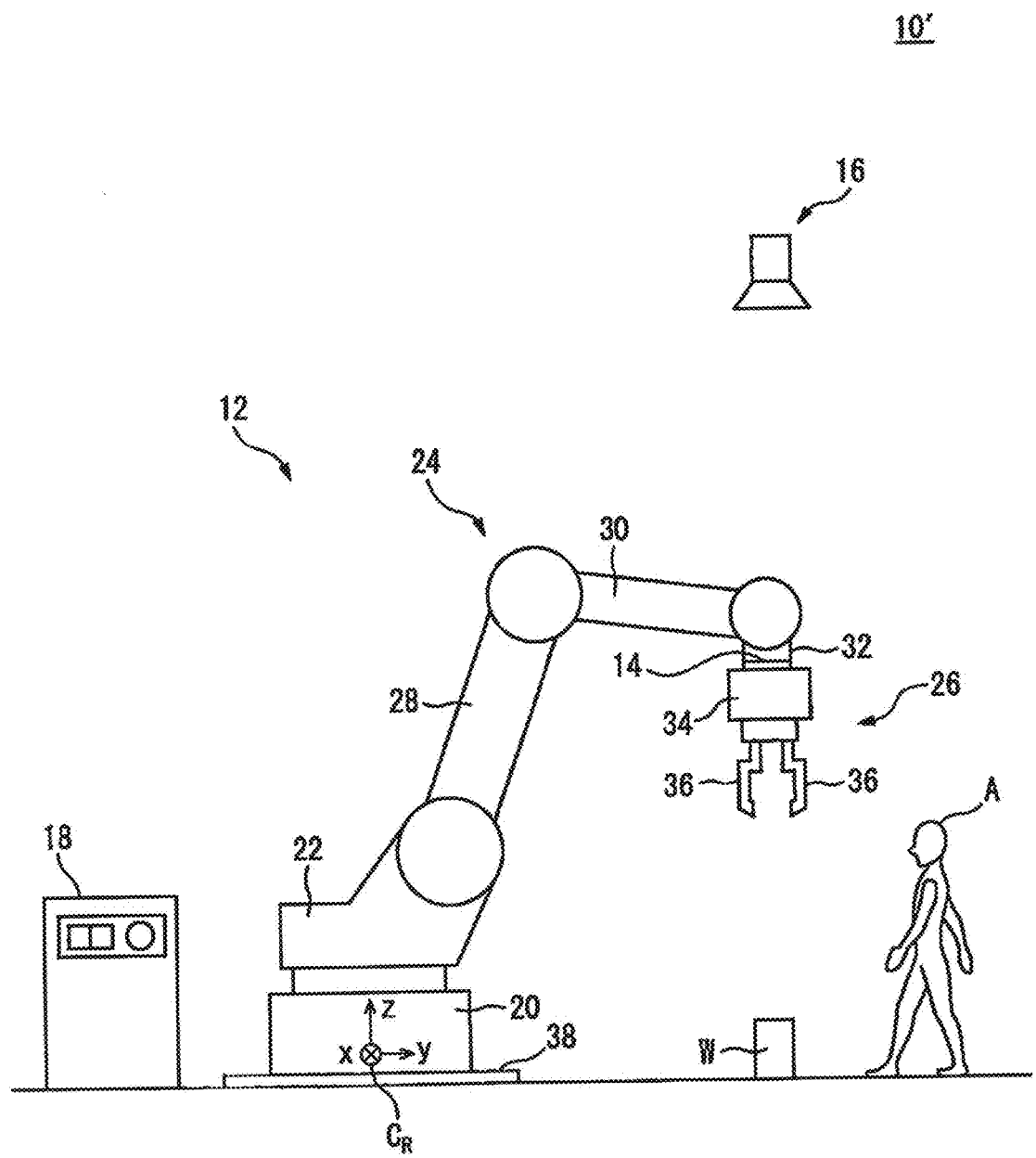
FIG. 15 is a diagram of a robot system according to still another embodiment.

Further, the detection apparatuses 16A and 16B may be configured by one detection apparatus. Such an embodiment is illustrated in FIG. 15. The robot system 10' illustrated in FIG. 15 includes one detection apparatus 16. The detection apparatus 16 is comprised of e.g. a 3D visual sensor, and functions as the above-described detection apparatuses 16A and 16B. Specifically, the detection apparatus 16 detects the work object W, as well as the predetermined action of the worker A to the work object W. The detection apparatus 16 may also be applied to the above-described robot system 50.

Figure 16:
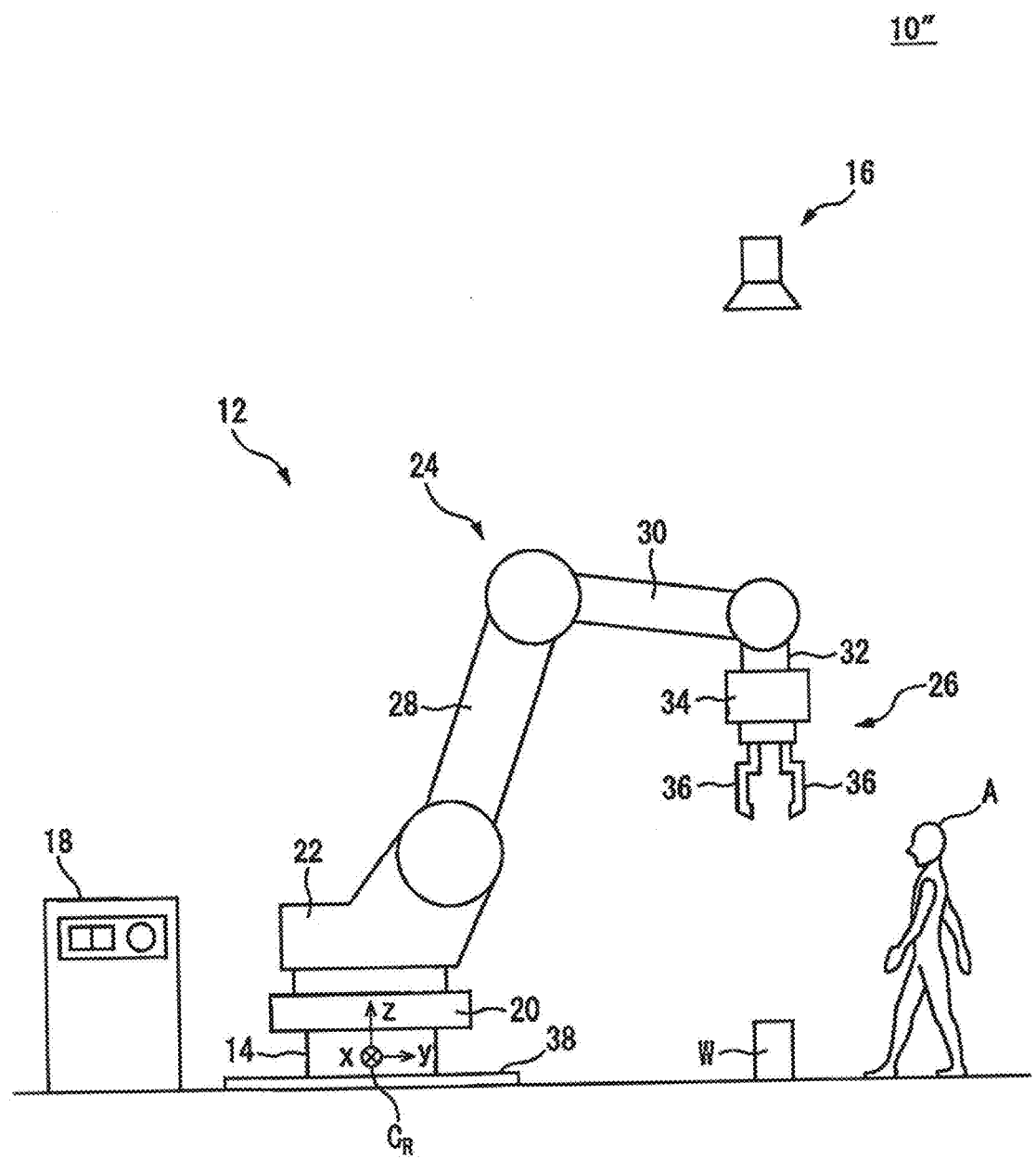
FIG. 16 is a diagram of a robot system according to still another embodiment.

Note that, in the robot system 10, the force detection device 14 may be provided at any position. Below, another example of the installation position of the force detection device 14 will be described with reference to FIG. 16. In a robot system 10" illustrated in FIG. 16, the force detection device 14 is interposed between the robot base 20 and the base plate 38. In this example, the force detection device 14 can detect the external force F applied to any component of the robot 12 (i.e., the robot base 20, the rotating torso 22, the robot arm 24, the wrist 32, or the robot hand 26).

Note that, the force detection device 14 is not limited to the six-axis force sensor, but may include e.g. a torque sensor configured to detect a torque about the drive shaft of each servomotor 40, and be configured to detect the external force F applied to the component of the robot 12 based on the detected value from each torque sensor. Alternatively, the force detection device 14 may be configured to detect the external force F applied to the component of the robot 12 based on a disturbance torque fed back from each servomotor 40.

The robot 12 (or 52) is not limited to the vertical articulated robot, but may be any type of robot, such as a horizontal articulated robot, a parallel link robot, or a loader. In addition, the robot 12 (or 52) may includes a robot main body comprised of the robot base 20, the rotating torso 22, the robot arm 24, the wrist 32, and the robot hand 26 (or the end effector 54); and a traveling device for moving the robot main body in any direction. In this case, the control device 18 may operate the traveling device to move the robot main body in step S5 and S10 (or step S25) described above.

Although the present disclosure has been described throughout the embodiments, the embodiments described above are not to limit the claimed invention.

The invention claimed is:

1. A robot system, comprising:
 a robot;
 a detection apparatus configured to detect a work object and a first predetermined action of a person to the work object; and
 a robot controller configured to cause the robot to execute a predetermined work on the work object detected by the detection apparatus, in response to the detection apparatus detecting the first predetermined action, wherein
 the detection apparatus is configured detect a second predetermined action of the person, the second predetermined action different from the first predetermined action, and
 the robot controller is further configured to cause the robot to
  grip and transport the work object based on a change of a distance between a position of the work object detected by the detection apparatus and a position of the person detected by the detection apparatus, and
  release the work object in response to the detection apparatus detecting the second predetermined action.

2. The robot system of claim 1, wherein the predetermined work is that the robot grips and transports the work object, wherein the robot controller is further configured to
 move the robot to a gripping position where the robot is to grip the work object based on the position of the work object detected by the detection apparatus, and
 cause the robot to grip the work object at the gripping position.

3. The robot system of claim 2, further comprising a force detection device configured to detect an external force applied to the robot,
 wherein the robot controller is further configured to cause the robot to transport the work object based on data of the external force detected by the force detection device.

4. The robot system of claim 1, wherein the detection apparatus is configured to detect, as the first predetermined action:

an action of the person approaching the work object;

an action of the person gripping the work object with a hand;

an action of the person pointing to the work object with a finger; or an action of the person tapping the work object with the hand.

5. A method of controlling a robot, comprising:

detecting a work object;

detecting a first predetermined action of a person to the work object;

causing the robot to execute a predetermined work on the detected work object in response to a detection of the first predetermined action;

detecting a second predetermined action of the person, the second predetermined action different from the first predetermined action;

causing the robot to grip and transport the work object based on a change of a distance between a position of the detected work object and a detected position of the person; and causing the robot to release the work object in response to a detection of the second predetermined action.

6. The control method of claim 5, wherein the predetermined work is that the robot grips and transports the work object, wherein the method further comprises, in response to the detection of the first predetermined action:

moving the robot to a gripping position where the robot is to grip the work object based on the position of the detected work object;

causing the robot to grip the work object at the gripping position; and causing the robot to transport the work object based on data of an external force applied to the robot, the external force detected by a force detection device.

7. The robot system according to claim 1, wherein the robot controller is further configured to cause the robot to grip and transport the work object in response to the distance being equal to or shorter than a predetermined threshold value.

8. The robot system according to claim 1, wherein the second predetermined action of the person includes a hand gesture.

* * * * *